United States Patent
Barkhurst

(10) Patent No.: US 6,854,373 B1
(45) Date of Patent: Feb. 15, 2005

(54) SCROLL SAW BLADE HOLDER AND ADAPTER

(75) Inventor: Corey D. Barkhurst, Harrisonville, MO (US)

(73) Assignee: R.B. Industries, Inc., Harrisonville, MO (US)

( * ) Notice: Subject to any disclaimer, the term of this patent is extended or adjusted under 35 U.S.C. 154(b) by 0 days.

(21) Appl. No.: 10/383,463

(22) Filed: Mar. 7, 2003

(51) Int. Cl.⁷ .............................................. B27B 19/10
(52) U.S. Cl. ............................ 83/699.21; 83/699.31; 83/699.51; 83/781; 83/786; 83/581.1; 83/662; 83/783
(58) Field of Search ...................... 83/698.11, 698.21, 83/699.31, 699.51, 954, 783, 581.1, 781, 662, 697, 786, 699.21; 30/329, 332, 334, 337, 339, 392, 507, 513; 403/17, 321, 372, 323, 327, 330, DIG. 4

(56) References Cited

U.S. PATENT DOCUMENTS

| 2,735,457 | A | * | 2/1956 | Raspanti ........................ 83/784 |
| 4,681,006 | A | * | 7/1987 | Miller ........................... 83/782 |
| 5,088,369 | A | * | 2/1992 | Rice et al. ..................... 83/783 |
| 5,105,704 | A | * | 4/1992 | Chang ........................... 83/662 |
| 5,272,948 | A | * | 12/1993 | Theising ........................ 83/786 |
| 5,351,590 | A | * | 10/1994 | Everts et al. ............. 83/699.21 |
| 5,363,733 | A | * | 11/1994 | Baird et al. .................... 83/786 |
| 5,410,933 | A | * | 5/1995 | Miyamoto et al. ............. 83/783 |
| 5,520,081 | A | * | 5/1996 | Rice et al. ..................... 83/781 |
| 5,896,799 | A | * | 4/1999 | Chen ............................. 83/786 |
| 5,941,153 | A | * | 8/1999 | Chang ........................... 83/662 |
| 6,463,840 | B1 | * | 10/2002 | Chang ........................... 83/783 |

* cited by examiner

Primary Examiner—Boyer D. Ashley
(74) Attorney, Agent, or Firm—J. David Wharton; Stinson Morrison Hecker LLP

(57) ABSTRACT

A blade holder and adapter for a scroll saw includes a slider within a slot in a scroll saw arm, with a retainer on the slider for receiving a scroll saw blade holder. An adjuster on the slider allows the slider to move within the slot and may be tightened to retain the slider in a fixed position. Moving the slider within the slot changes the angle of the blade relative to the table of the scroll saw.

11 Claims, 2 Drawing Sheets

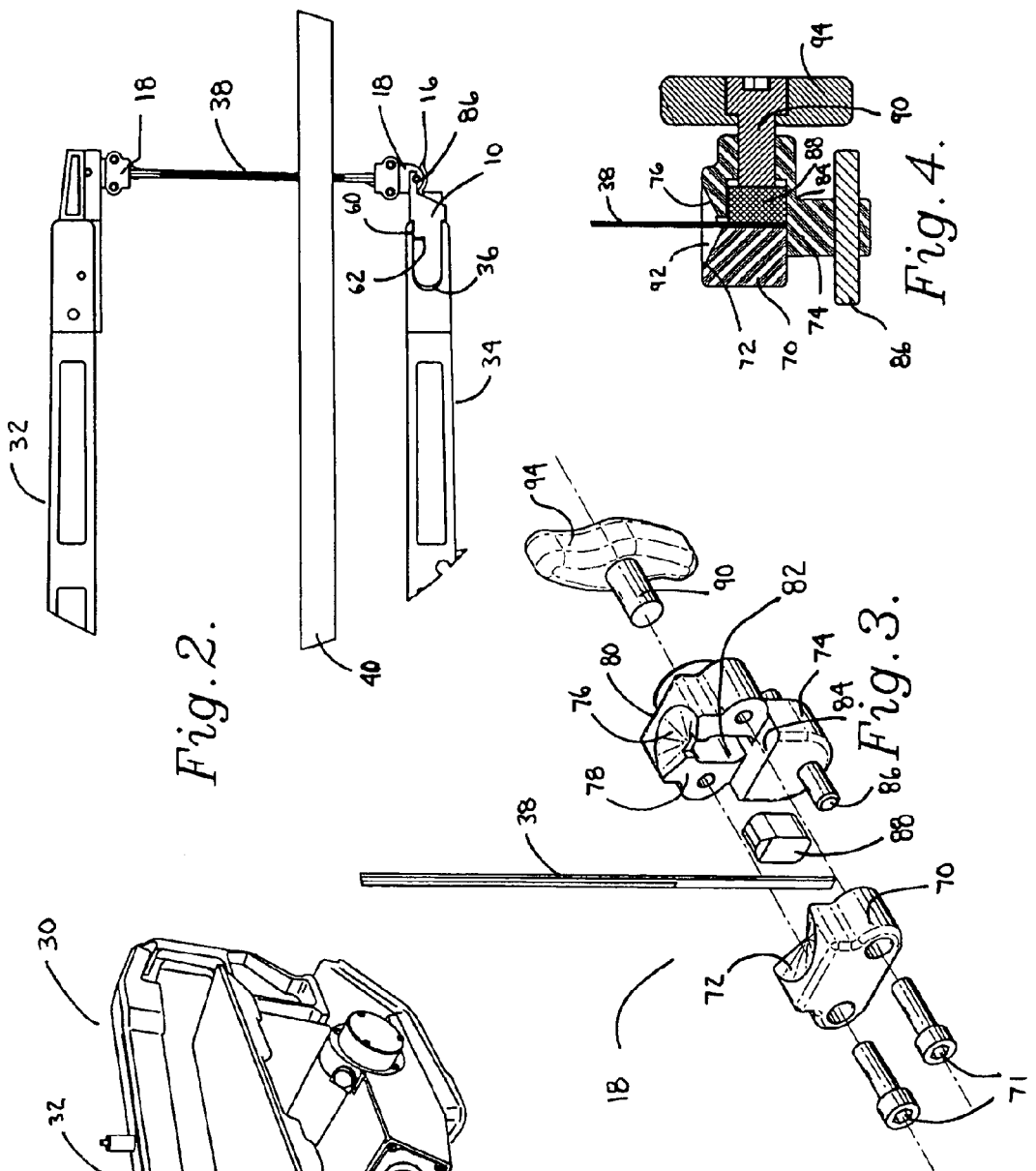

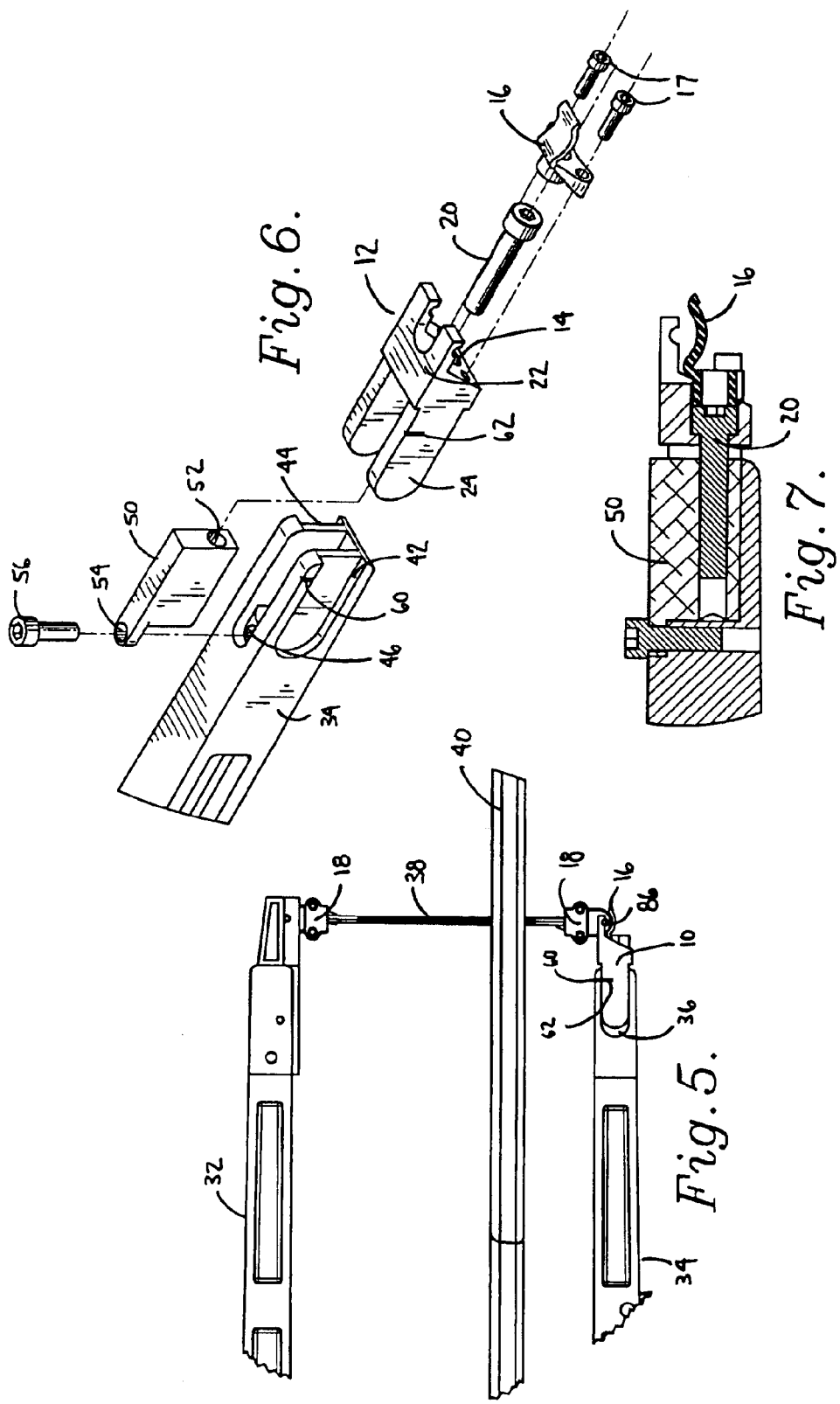

SCROLL SAW BLADE HOLDER AND ADAPTER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The invention relates to a scroll saw, and more particularly to a scroll saw blade holder and adapter.

2. Description of Related Art

Scroll saws are used for precision cutting of various materials, ranging from soft materials such as wood and plastics, to hard materials such as metals and composites. Typical configurations of scroll saws secure the blade of the saw between two fixed arms in a substantially vertical position with respect to the work surface and the material being cut. There is no adjustment to vary the position of the blade from vertical, thus the angle of attack between the blade and the material being cut is constant, and cannot be varied according to the properties of the material being cut.

However, the vertical alignment of the blade is not always desirable, as different materials present different load and frictional characteristics to the blade. Thus, while a substantially vertical blade may perform well with harder materials, such as metals, it may tend to bind or lift softer materials, such as wood. Likewise, even different thicknesses of the same material may not work well with a substantially vertical blade, as thin materials may tend to lift from the work table when engaging a nearly vertical blade.

SUMMARY OF THE INVENTION

The present invention is directed to a scroll saw blade holder and adapter that allows the user of the scroll saw to easily load and secure a scroll saw blade, and to vary the angle of attack of a scroll saw blade with respect to the work table and the material being cut. The blade holder provides a concave top that directs a scroll saw blade between the two halves of the blade holder for easy loading of the blade. The clamping block mechanism on the blade holder securely holds the blade in place without requiring precision machining of the holder and clamping parts. The blade adapter allows movement of the secured blade laterally with respect to an arm of the scroll saw, thus allowing the angle of the blade with respect to the work table and material to be adjusted.

In one embodiment of the invention, a blade holder is comprised of a first piece and a second piece, each having a concave top side. The second piece has a front side and a back side, with a clamping aperture extending therethrough. A blade stop extends outwardly from the front side of the second piece to provide a shelf on which an inserted scroll saw blade can rest. An engaging projection extends outwardly from the front side of the second piece for securing the blade holder to a blade holder adapter. A clamping block is inserted within the clamping aperture adjacent to the front side of the second piece, and a clamping shaft is inserted into the clamping aperture adjacent to the back side of the second piece. In use, fasteners secure the two pieces, forming a concave blade receptacle. A scroll saw blade is inserted into the receptacle, with the concave surface acting to direct the blade into place. With fasteners securing the first and second pieces together, the blade is held in place. Further securing of the blade is achieved by tightening the clamping shaft within the clamping aperture which forces the clamping block against the blade. The use of the clamping block to provide final tightening and securing of the blade eliminates the need for precision machining of the first and second pieces, as the clamping block will provide final clamping pressure against the blade regardless of the finish of the mating surfaces of the two pieces.

In another embodiment of the invention, the concave blade receptacle is substantially conical in shape to direct an inserted blade between the first and second pieces.

In yet another embodiment of the invention, the angle of the conical shape of the concave blade receptacle is between 120 and 140 degrees.

In yet another embodiment of the invention, the angle of the conical shape of the blade receptacle is about 130 degrees.

In another embodiment of the invention, at least a portion of the clamping aperture is threaded, and at least a portion of the clamping shaft is threaded, such that turning the clamping shaft within the clamping aperture engages the threaded portion of the clamping aperture against the threaded portion of the clamping shaft, allowing the clamping shaft to be tightened or loosened against the clamping block, thus tightening or loosening the blade.

In yet a further embodiment of the invention, the clamping shaft comprise a handle to allow easily turning the clamping shaft within the clamping aperture.

In another embodiment of the invention, the engaging projection for securing the blade holder to the blade holder adapter is a pin.

In another embodiment of the invention, a scroll saw has an upper arm and a lower arm, with one of the arms holding a blade in a fixed position, and the other arm comprising a slot for receiving a blade holder adapter. The saw includes a table for receiving and holding a work piece. The blade holder adapter comprises a slider, with an aperture therethrough, adapted to be received in the slot on the scroll saw arm, a retainer for receiving and securing a blade holder, and an adjuster inserted through the aperture of the slider and engaged to the slotted arm of the scroll saw.

Moving the adjuster within the aperture allows the slider to move within the slot of the scroll saw arm, thus moving the slider relative to the arm. A blade holder secured to the adapter also moves relative to the scroll saw arm, changing the position and the angle of attack of the blade relative to the work table.

In another embodiment of the invention, the slider has a main body and an elongated tab extending from the main body, the tab being received within the slot in the scroll saw arm.

In yet another embodiment of the invention, the slider has a main body and first and second elongated tabs extending from the main body, the tabs being received within the slot in the scroll saw arm, with the slot in the scroll saw arm comprising first and second elongated recesses on opposite sides of the arm.

In another embodiment of the invention, the retainer is a spring clip adapted to retain an engaging projection from the blade holder, secured to the slider with fasteners.

In another embodiment of the invention, the slotted arm comprises a locking mechanism having a horizontal aperture and a vertical aperture. The horizontal aperture is engageable with the adjuster, and a fastener is inserted through the vertical aperture to engage the scroll saw arm to secure the locking mechanism in place.

In another embodiment of the invention, the slotted arm of the scroll saw comprises a first indexing mark, and the slider comprises a second indexing mark. The angle of attack of the blade can be ascertained by the relative position of the second indexing mark to the first indexing mark.

In yet another embodiment of the invention, substantial alignment of the first and second indexing marks indicates that the blade is substantially vertical.

In another embodiment of the invention, a scroll saw comprises an upper arm and a lower arm, with at least one of the arms including a slot for receiving a blade holder adapter. The other arm holds the blade in a fixed position, and a work table receives the work piece to be cut. The angle of attack of the blade can be varied by securing the first end of the blade to the fixed position arm, securing the second end of the blade to the blade holder adapter, moving the blade holder adapter laterally within the slot to a desired position, and locking the blade holder adapter in place.

The blade holder and adapter of the present invention allows easy loading and clamping of a scroll saw blade, and eliminates the need for precision machining of parts to clamp the blade into place. The adapter allows the angle of attack of the blade relative to the work piece to be easily adjusted, and a locking mechanism securely holds the adjustable adapter, and thus the blade, at the desired angle. Indexing marks facilitate easily ascertaining the angle of attack of the blade.

BRIEF DESCRIPTION OF THE DRAWINGS

FIG. 1 is a perspective view of a scroll saw having the blade holder and adapter of the present invention.

FIG. 2 is a side elevational view of the scroll saw of FIG. 1 with the blade adjusted to a non-vertical position by the blade holder adapter.

FIG. 3 is an exploded perspective view of the blade holder of the present invention.

FIG. 4 is a side sectional view of the assembled blade holder of FIG. 3.

FIG. 5 is a side elevational view of the scroll saw of FIG. 1 with the blade to a vertical position by the blade holder adapter.

FIG. 6 is an exploded perspective view of the blade holder adapter of the invention.

FIG. 7 is a side sectional view of the assembled blade holder adapter of FIG. 6.

DETAILED DESCRIPTION OF PREFERRED EMBODIMENT

A scroll saw blade holder and adapter according to the present invention is in FIGS. 1 to 7.

Turning first to FIG. 1, a scroll saw 30 comprises an upper arm 32, a lower arm, 34, a blade 38, and a table 40 for receiving a work piece. As best seen in FIGS. 2 and 5, lower arm 34 comprises a slot 36 for receiving blade holder adapter 12, to which blade holder 18 is secured. Upper arm 32 maintains a second blade holder 18 in a fixed position, and blade 38 is secured between the two blade holders 18. Moving blade holder adapter 12 within slot 36 changes the position of the lower end of blade 38 relative to the fixed upper end. Thus, moving blade holder adapter 12 within slot 36 changes the angle of attack of blade 38 relative to the table 40. While the attachment of blade holder 18 to upper arm 32 is shown as fixed, and lower arm 34 is shown as slotted, those skilled in the art will appreciate that either the upper or the lower arm, or both, could be slotted to accommodate the blade holder adapter of the present invention and still be within the scope of the present invention. Likewise, other embodiments of the configuration depicted are anticipated and within the scope of the present invention.

Referring to FIG. 3, a scroll saw blade holder in accordance with one embodiment of the present invention comprises a first piece 70 having a concave top 72, and a second piece 74 having a concave top 76, a front side 78, and a back side 80. A clamping aperture 82 extends through the second piece 74 from the front side 78 to the back side 80. A blade stop 84 projects from the front side 78 of the second piece 74 to provide a resting point for the blade 38. Clamping block 80 engages into the clamping aperture 82 from the front side 78 of the second piece 74. Clamping shaft 90 engages into the clamping aperture 82 from the back side 80 of second piece 74, and includes a handle 94 to allow easily turning or moving the clamping shaft Fasteners 71 secure first piece 70 to second piece 74.

As best seen in FIG. 4, when fully secured together, the concave top 72 of the first piece 72 and the concave top 76 of the second piece 74 present a concave blade receptacle 92 for receiving and directing the blade 38 to the area between the first and second pieces. Blade 38 is inserted between the first piece 70 and the second piece 74 until it comes to rest against blade stop 84. Clamping shaft 90 is tightened into clamping aperture 82, forcing clamping block 88 against the blade 38 and holding it in place. The blade is thus secured between the first piece 70 and the second piece 74. Thus, while first piece 70 and second piece 74 provide some amount of clamping force to blade 38, clamping block 88 provides additional clamping force that is independent of the machining tolerances of first piece 70 and second piece 74.

In one embodiment, clamping aperture 82 and clamping shaft 90 are threaded so that turning clamping shaft 90 engages the threads of clamping aperture 82 and allows tightening and loosening of clamping block 88 against blade 38. Other methods of engaging clamping shaft 90 within clamping aperture 82, such as line-to-line or friction fit are anticipated by the present invention.

As shown in FIG. 6, lower arm 34 comprises first and second recesses 42, 44, a locking aperture 46, and a first indexing mark 60. Blade holder adapter comprises a slider 12 having an aperture 14, a retainer 16, and an adjuster 20. Slider 12 comprises a main body 22, first and second elongated tabs 22, 24 extending rearwardly from main body 22, and a second indexing mark 62. Retainer 16 is a spring clip secured to the slider 12 with fasteners 17 and is adapted to receive and secure and engaging projection from a blade holder. Locking mechanism 50 comprises a horizontal aperture 52 and a vertical aperture 54.

Referring to FIGS. 6 and 7, retainer 16 is secured to slider 12 using fasteners 17. The first and second elongated tabs 22,24 of slider 12 are inserted into the first and second elongated recesses 42, 44 on the scroll saw lower arm 34. A fastener 56 inserted through vertical aperture 54 and into locking aperture 46 secures the locking mechanism vertically to lower arm 34. Adjuster 20 inserted through aperture 14 engages with horizontal aperture 52 of locking mechanism 50, and secures slider 12 horizontally to the locking mechanism 50. Turning adjuster 20 moves the slider 12 within the recesses 42, 44 of the lower arm 34, and thus changes the position of retainer 16 with respect to lower arm 34. Thus, a blade holder secured in retainer 16 changes position, and the blade held by the blade holder changes its angle of attack relative to the work piece being cut in response to movement of slider 12. While retainer 16 as shown is a spring clip for easy insertion and removal of the blade holder, any fastening mechanism known in the art may be used to secure the engaging projection 86 of the blade holder.

As seen in FIGS. 2 and 5, engaging projection 86 of blade holder 18 is secured to blade holder adapter 10 by retainer 16. First indexing mark 60 and second indexing mark 62 indicate the relative position of blade holder adapter 10 to lower arm 34. As shown in FIG. 5, substantial alignment of the first and second indexing marks indicates that the blade 38 is vertical. As shown in FIG. 2, non-alignment of the indexing marks indicates that the blade is not vertical. It is understood that additional indexing marks may be included to indicate specific angles of attack of the blade with respect to the work piece, or that other indicators, such as gauges, may be used to indicate the relative position of the blade holder adapter 10 to the lower arm 34.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A blade holder adapter for a scroll saw, said saw having an upper arm and a lower arm, at least one of said arms comprising a slot for receiving said adapter, the other arm holding a first end of a blade in a fixed position, and a table for receiving a work piece to be cut, said adapter comprising:

a slider adapted to be received in said slot, said slider having an aperture, wherein said slider comprises a main body and first and second elongated tabs extending rearwardly from said main body, wherein said first and second elongated tabs are substantially parallel to each other such that a gap is defined between said tabs;

a retainer on said slider for receiving a blade holder, said blade holder adapted to secure a second end of said blade such that said blade is held at an angle relative to said table;

an adjuster received in said aperture of said slider and engageable with said slotted arm to move said slider in said slot and retain said slider in a fixed position;

whereby when said adjuster moves said slider, the angle of said blade relative to said work piece located on said table is changed.

2. The blade holder adapter of claim 1, wherein said slotted arm comprises a first indexing mark and wherein said slider comprises a second indexing mark, whereby the alignment of said first and second indexing marks indicates the angle of attack of said blade.

3. The blade holder adapter of claim 1, wherein said slot comprises first and second elongated recesses formed on opposite sides of said slotted arm adapted to receive said elongated tabs.

4. The blade holder adapter of claim 3, wherein said retainer comprises a spring clip adapted to be removably coupled to said slider, whereby an engaging projection inserted between said slider and said spring clip is retained in place.

5. The blade holder adapter of claim 4, wherein said slotted arm comprises a locking mechanism having a horizontal aperture and a vertical aperture, said horizontal aperture engageable with said adjuster, whereby a fastener engageable with said slotted arm inserted through said vertical aperture secures said locking mechanism to said slotted arm.

6. A blade holder for a scroll saw, said saw having an upper arm and a lower arm, each of said arms having a blade holder adapter for receiving said blade holder, and a table for receiving a work piece to be cut, said holder comprising:

a first piece having a concave top side, a second piece having a concave top side, a front side and a back side, a clamping aperture extending from said front side to said back side, a blade stop adjacent said clamping aperture extending outwardly from said front side, and an engaging projection extending outwardly from said blade stop, a clamping block adapted to be received within said clamping aperture, said clamping block being inserted in said clamping aperture adjacent said front side of said second piece, a clamping shaft adapted to be received in said clamping aperture, said clamping shaft received within said clamping aperture, wherein said first piece is removably coupled to said second piece to present a concave blade receptacle for receiving said blade, and wherein rotating said clamping shaft causes movement of said clamping block within said clamping aperture to engage and hold said blade.

7. The blade holder of claim 6, wherein said concave blade receptacle is substantially conical in shape.

8. The blade holder of claim 7, wherein the angle of said conical concave blade receptacle is about 130 degrees.

9. The blade holder of claim 7, wherein said engaging projection is a pin.

10. The blade holder of claim 7, wherein at least a portion of said clamping aperture is threaded.

11. The blade holder of claim 10, wherein at least a portion of said clamping shaft is threaded.

* * * * *